United States Patent
Keller

[15] 3,673,893
[45] July 4, 1972

[54] METHOD OF MAKING RAKE TINE SUPPORT

[72] Inventor: William A. Keller, Crestwood, Mo.

[73] Assignee: Keller Manufacturing Co., Inc., St. Louis, Mo.

[22] Filed: Feb. 12, 1970

[21] Appl. No.: 10,825

[52] U.S. Cl. ............................76/111, 29/160, 29/437, 29/509, 56/400.17
[51] Int. Cl. ................B21d 53/63, B21h 7/08, B21k 11/14
[58] Field of Search ...............29/509, 160, 437; 76/111; 56/400.17

[56] References Cited

UNITED STATES PATENTS

| | | | |
|---|---|---|---|
| 1,603,678 | 10/1926 | Furey | 29/509 UX |
| 2,105,548 | 1/1938 | Montan et al. | 56/400.17 |
| 2,205,827 | 6/1940 | Brooke | 56/400.17 |
| 2,274,125 | 2/1942 | Carney | 29/160 X |
| 2,294,157 | 8/1942 | Brooke | 56/400.17 |

*Primary Examiner*—Charlie T. Moon
*Attorney*—Kingsland, Rogers, Ezell, Eilers & Robbins

[57] ABSTRACT

A rake having a rake tine support bar provided in its manufacture with open slots in which the tines can be laid easily and rapidly with flanges overlying the tines at right angles and which are adapted to be bent from opposite sides of the slot to a converging or angled relationship to a tine retaining relationship. The bending of the flanges can be automatically effected in a jig or the like by automatic means insuring a rapid installation of the tines. The converging relationship of the flanges with the rake tine loosely fitting in the slots provides a floating arrangement for the tines to minimize wear and prevent undue strain upon them.

6 Claims, 11 Drawing Figures

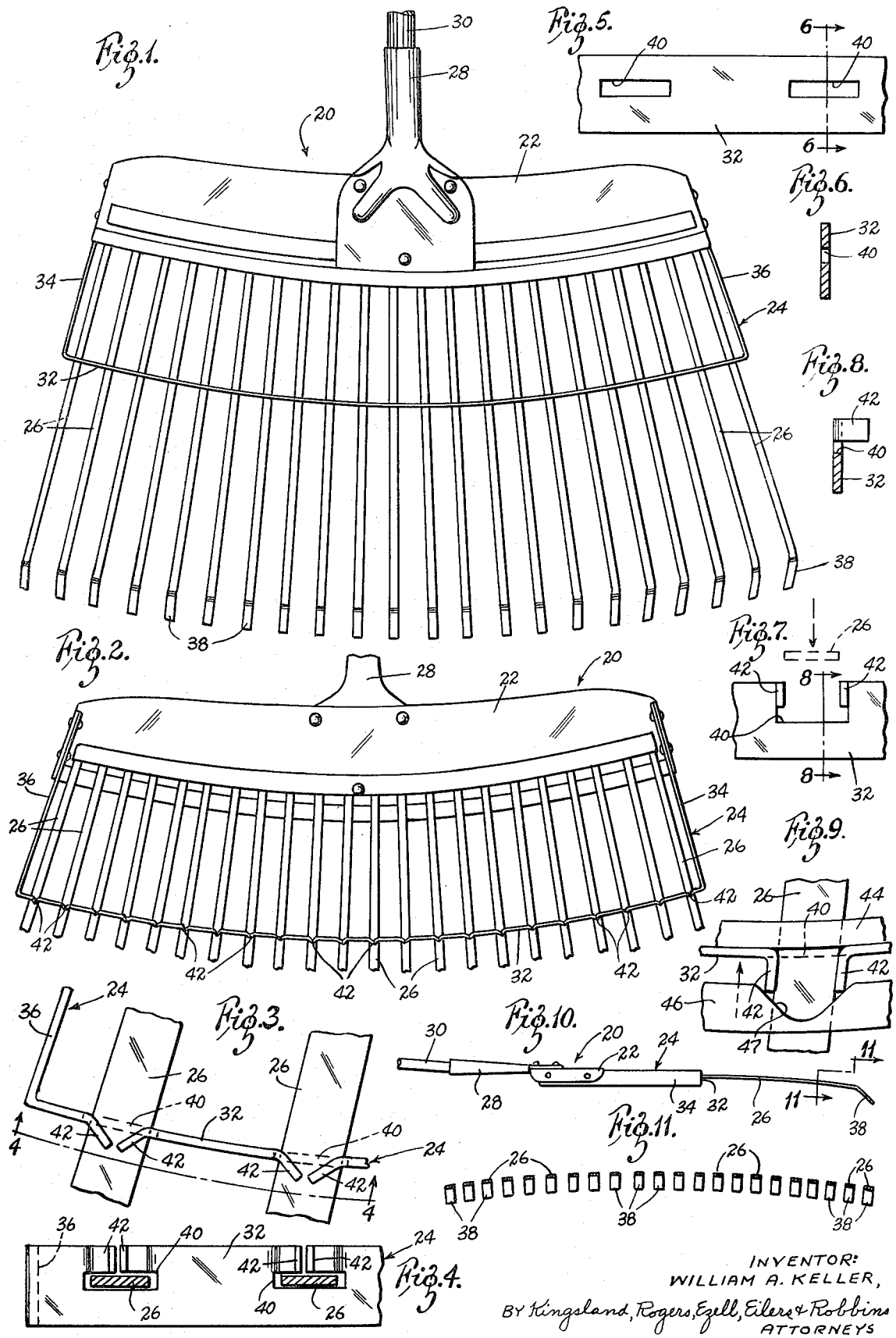

3,673,893

METHOD OF MAKING RAKE TINE SUPPORT

BACKGROUND OF THE INVENTION

The instant invention pertains to a light rake for raking loose grass, leaves and the like. In the past, such rakes have been provided in which long, flexible tines are manually inserted in slots in a rake support bar to be received therethrough and supported at one end by support means connected to the rake. This is a laborious procedure in that manual interfitting of the ends of the tines through the slots is required which takes an operator a substantial period of time.

SUMMARY OF THE INVENTION

By means of this invention there has been provided a rake tine support bar which is simply constructed and greatly reduces the amount of time required in connecting the tines to the support bar. The support bar used in the manufacture of the rake is provided with a slot open at the upper end and with right angled flanges which are formed by cutting a top portion of the support bar and bending the flanges out at right angles to the bar. The construction of the bar lends itself to ready insertion of the tines in the opened slots from the top of the bar. This is accomplished by simply laying the tines into the open end of the slot.

After insertion, the support bar with the tines may be simply closed in a jig or the like by providing closing pressure between front and rear anvils to bend the right angle position flanges to a converging relationship in which position they lock the tines into the closed slot. The converging relationship of the flanges provides a floating action of the tines within the slot so that they have a restricted degree of movement permitting them to bend or move and prevent undue stress and strain being placed thereupon.

The assembly of the rake can be effected in a very short period of time and can be accomplished by relatively unskilled workmen.

The above features are objects of this invention and further objects will appear in the detailed description which follows and will be otherwise apparent to those skilled in the art.

For the purpose of illustration of this invention in accompanying drawings, there is shown a preferred embodiment thereof. It is to be understood that these drawings are for the purpose of illustration only and that the invention is not limited thereto.

BRIEF DESCRIPTION OF THE DRAWINGS

FIG. 1 is a top plan view of the rake of this invention;

FIG. 2 is a fragmentary bottom plan view;

FIG. 3 is an enlarged fragmentary plan view of the left-hand portion of the tine support bar showing the final position of the flanges in tine retaining relation;

FIG. 4 is a view in section taken on the line 4—4 of FIG. 3;

FIG. 5 is a fragmentary plan view of the support bar before the retaining flanges are formed;

FIG. 6 is a view in section taken on the line 6—6 of FIG. 5;

FIG. 7 is an enlarged fragmentary view in front elevation of a portion of the tine support bar after the retaining flanges have been cut from the top of the slot and bent at right angles and before the insertion of the tine;

FIG. 8 is a view in section taken on the line 8—8 of FIG. 7;

FIG. 9 is a fragmentary top plan view showing the die forming operation for closing the retaining flanges over the rake tines;

FIG. 10 is a view in side elevation on a reduced scale taken from the left side of FIG. 1;

FIG. 11 is a view in section taken on the line 11—11 of FIG. 10;

DETAILED DESCRIPTION OF THE INVENTION

The rake of this invention is generally indicated by the reference numeral 20 in FIG. 1. As there shown, it is comprised of a base 22 and a U-shaped rake tine support bar 24 connected to the base, a plurality of rake tines 26, a ferrule 28 connected to the base and a handle 30 inserted in the ferrule.

The support bar 24 is comprised of a main bar section 32 and legs 34 and 36 anchored to the base. The main section 32 of the support bar has a slightly arcuate configuration so as to receive the tines 26 in a cup-shaped fashion as shown in figures 10 and 11. The ends of the rake tines 26 have angled finger portions 38 in order to provide for gripping of leaves, grass, and the like. The cup-shaped or arcuate configuration of the support bar and the tines provides for a degree of flexibility in the raking action.

The particular construction of the rake tine support bar is best shown in FIGS. 3 to 9. As shown in FIGS. 7 and 8, a plurality of slots 40 are provided in which right-angled flanges 42 are cut out from the top of the support bar and bent away therefrom at right angles so as to receive a rake tine 26.

THE PROCESS OF MANUFACTURE

After the rake tines have been inserted in the top of the open slots 40 in the support bar, the flanges 42 are bent over to the converging relationship shown in FIG. 3. This operation as best shown in FIG. 9 locks the tines in place but permits a floating action and some degree of movement due to the loose interfitting within the locked slot as shown in FIG. 4.

The locking operation of the tines in place in the open slot of the rake support bar is best shown in FIG. 9. The rake tines are simply laid on top of the slot 40 in between the opposed right-angled flanges. In this position a rear arcuately shaped anvil 44 is brought to bear against the rear of the support bar.

Then a front anvil 46 having cup-shaped camming surfaces 47 is moved in the direction of the arrow shown in FIG. 9 to close the right-angled flanges 42 to the converging position shown in FIG. 3. It will be noted that the flanges shown in FIG. 3 are slightly longer than the distance between the ends of the slots. This is due to the cutting of the top portion of the slot in the manufacturing operation of the right-angled flanges since a slight drawing of the metal of the support bar is effected in the cutting and bending operation in the manufacture of these flanges. The top ends of the rake tines are connected to the base 22 of the rake in any conventional fashion, such as by press fitting, riveting, or welding or the like.

The rake, after construction, has a high degree of flexibility due to the particular configuration of the slots and the free or floating action of the rake tines within the slots due to the converging relationship of the retaining or locking flanges as best shown in FIG. 3. This freedom of movement of the tines within the slots prevents undue stress or strain and ensures a more efficient raking operation when coupled with the arc-like or cup-like configuration of the tines shown in FIG. 10.

Various changes and modifications may be made within this invention as will be readily understood by those skilled in the art. Such changes and modifications are within the scope of teaching this invention as defined by the claims appended hereto.

I claim:

1. A method of manufacturing a rake in which rake tines are loosely supported in a support bar, which comprises providing a bar with spaced slots which have an openIng communicating with one side of the bar, said opening being bounded by flanges extending at right angles to said bar, laying tines in the slots, said tines having a width less than the width of the slots and at least partially closing said flanges over the tines in tine-retaining relation so that the tines are loosely supported within the slots.

2. The method of claim 1 in which one of the sides of the bar bounding the slots in the support bar is sheared and drawn at a medial portion of the slots bent at right angles to form the right-angled retaining flanges having a combined length slightly greater than the width of the slot.

3. The method of claim 1 in which the right-angled flanges are bent at an acute angle to the support bar and converge over the enclosed tines in said slots to provide a limited degree of movement of the tines in the slots.

4. The method of claim 1 in which the closing of the flanges is effected by engaging a rear side of the bar with a rear anvil to prevent movement of the bar and engaging the right-angled flanges with a front anvil to at least partially close the flanges in retaining relation over the tines.

5. The method of claim 4 in which the front anvil is provided with a plurality of cup-shaped camming surfaces in registry with the slots in the bar for engaging the flanges at an angle to effect the bending of the flanges when the front anvil is moved toward the bar.

6. The method of claim 4 in which the rear anvil has an arcuate configuration along its length and said front anvil has a generally mating relation with the rear anvil.

* * * * *